Patented Sept. 21, 1954

2,689,859

UNITED STATES PATENT OFFICE 2,689,859

CHLORINATED ORGANOPOLYSILOXANES

Charles A. Burkhard, Alplaus, N. Y., assignor to General Electric Company, a corporation of New York No Drawing. Application February 24, 1950, Serial No. 146,157

7 Claims. (Cl. 260—448.2)

This invention relates to new and useful synthetic non-resinous liquid compositions and methods of making the same. More particularly, the invention is concerned with fluid or oily (non-resinous) compositions comprising a liquid linear polysiloxane containing the structural unit

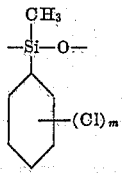

in the linear chain where $m$ is an integer equal to from 1 to 2, inclusive, and having terminal silicon atoms to each of which are attached three methyl groups. If desired, the compositions described herein may have intercondensed therewith dimethyl siloxane units

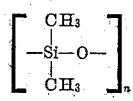

in varying proportions where $n$ is an integer equal to at least 1. The liquid linear polysiloxanes embraced by the claimed invention can also be defined as corresponding to the general formula

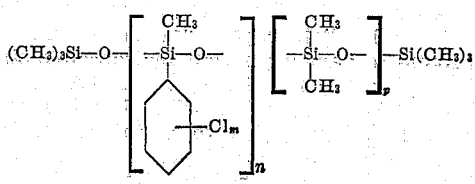

where $m$ has the meaning given above, and $n$ is an integer equal to at least one, for example, from 1 to 20 or more, and $p$ may be 0 or may be an integer equal to at least one, for instance, from 1 to 20 or more.

In U. S. Patents 2,469,888 and 2,469,890, issued May 10, 1949, and assigned to the assignee of the present invention, are disclosed and claimed linear polysiloxanes corresponding to the general formula

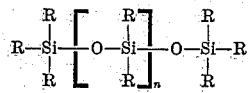

in which the R's represent the same or different monovalent hydrocarbon radicals, and $n$ is an integer equal to at least 1.

I have now discovered that liquid organopolysiloxanes containing the structural unit

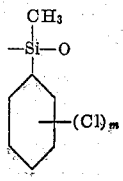

in the chain and having terminal silicon atoms to each of which are attached three methyl groups when employed for certain purposes, particularly as lubricants, have improved properties over other liquid polysiloxanes, e. g., liquid methylpolysiloxanes, employed in the same application. I have found that the presence of a chlorophenyl radical attached to the silicon atom in the polysiloxane by a C—Si linkage improves the lubricating properties of the organopolysiloxane when it is employed as a lubricant in high pressure applications.

As pointed out above, the chlorophenyl radical in my claimed compositions of matter may contain from one to two chlorine atoms attached directly to the benzene nucleus and the chlorine atom may be ortho, meta, or para to the silicon atom if only one chlorine atom is present, or if two chlorine atoms are present attached to the benzene nucleus, these chlorine atoms may be either in a vicinal, asymmetrical or symmetrical relationship with the silicon atom to which the benzene nucleus is attached.

If desired, my claimed compositions may also have intercondensed therewith varying amounts of dimethylsiloxane. When both the methyl chlorophenylsiloxy units and the dimethylsiloxy units are present in the linear polysiloxane, the relationship of these units to the terminal silicon atoms may vary. It is possible that in one instance one or more of the same structural units (i. e., the methyl chlorophenylsiloxy or dimethylsiloxy units) may be adjacent to each other or it is possible there may occur regular alternations of the two different siloxy units for certain lengths of the linear chain, etc. Whichever final structure may exist in the linear polysiloxane, both aforementioned units are present in the chain simultaneously. Also, it has not been determined clearly which of the two aforementioned structural units are closest the terminal silicon atoms when both of the units are in the molecule. Thus, in one combination, in connection with terminal trimethyl silyl groups, it is possible to have either a dimethyl siloxy or a methyl chlorophenyl siloxy unit immediately adjacent each of the two terminal silicon atoms to give the following general formulae:

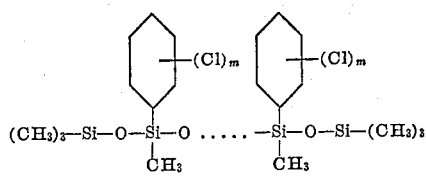

or

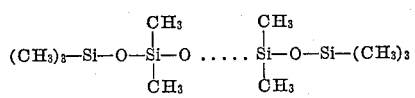

It is also possible in the same molecule to have one dimethyl siloxy unit and one methyl chlorophenyl siloxy unit adjacent each of the two terminal silicon atoms respectively as illustrated by the following general formula:

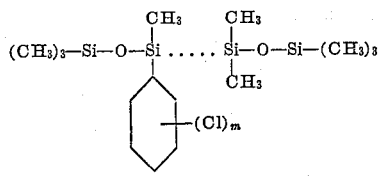

Regardless of the actual structure where these mixed siloxy units are present, the final product comprises a mixture of liquid linear polysiloxanes having a ratio of more than 2 and less than 3 silicon-bonded organic groups per silicon atom, wherein the distribution of the structural units is one of generally random distribution depending upon such factors as, for instance, proportions of ingredients employed in the preparation of the liquid polysiloxanes, hydrolysis conditions, etc.

In order that those skilled in the art may better understand how the invention may be practiced, the following examples are given by way of illustration and not by way of limitation. All parts are by weight.

EXAMPLE 1

*Preparation of methyl p-chlorophenyldichlorosilane*

About 574.5 grams (3 mols) p-chlorobromobenzene and 72 grams (3 mols) magnesium turnings were allowed to react in the presence of 1.5 liters of anhydrous ether. When the reaction was complete, the ether solution was added dropwise with stirring to 470 grams methyltrichlorosilane in 1 liter of anhydrous ether. After the complete reaction, the ether and excess methyltrichlorosilane were stripped from the reaction mixture and the organochlorosilanes of higher boiling points were removed by a higher vacuum distillation. This material was then rectified in a rectification colum to give 197.2 grams methyl-p-chlorophenyldichlorosilane having a boiling point of 161–164° C. at 99–100 mm. Analysis of the compound showed it to contain 30.9 per cent hydrolyzable chlorine as compared to the theoretical value of 31.44%.

*Preparation of methyl p-chlorophenyl silicone oil*

160 grams methyl p-chlorophenyldichlorosilane was dissolved in 150 ml. of ether and added to a vigorously stirred mixture of water and ether. After hydrolysis was complete, the ether layer was washed to free it of acid and then evaporated to leave an oily liquid comprising a mixture of cyclic polymers of methyl p-chlorophenyl siloxane. A crystalline material was isolated which analysis showed it to comprise 1,3,5 - trimethyl - 1,3,5 - tris - p - chlorophenyl-cyclotrisiloxane having a melting point of 125–126° C. This material was found to contain 49.5% carbon, 5.0% hydrogen, and 20.2% chlorine and had a molecular weight of 511. The theoretical values were C=49.3%, H=4.16%, Cl=20.8% and molecular weight=512. About 98.7 grams of this oily liquid was mixed with 98.7 grams hexamethyldisiloxane and 4 ml. concentrated $H_2SO_4$. The mixture was placed in a glass vessel and shaken vigorously at room temperature for about 24 hours. Thereafter the oil was washed to free it of acid and then distilled to remove excess hexamethyldisiloxane. The oily liquid thus obtained had a viscosity of 55 centistokes at 100° F. and 8.61 centistokes at 210° F. showing a viscosity temperature coefficient of 0.84. This material comprised essentially a mixture of ingredients corresponding to the formula

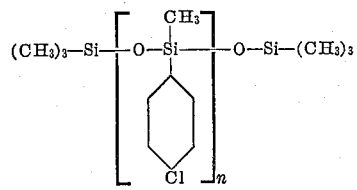

where $n$ is an integer equal to or greater than 1. Analysis showed the composition to contain 16.9 per cent chlorine.

EXAMPLE 2

*Preparation of methyl - 3,4 - dichlorophenyldichlorosilane*

A Grignard reagent comprising 3,4-dichlorophenyl magnesium bromide was prepared by allowing 99.1 grams of 3,4-dichloro-1-bromobenzene to react with 11 grams of magnesium turnings in 250 ml. anhydrous ether. This Grignard reagent was then added dropwise with stirring to a mixture of 149 grams methyltrichlorosilane in 200 ml. anhydrous ether. The reaction product was heated to insure complete reaction and thereafter distilled to yield 38 grams of a product boiling at 127–133° C. at 10 mm. and 9.2 grams of a second product boiling at 249–250° C. at 10 mm. The first product was identified as methyl-3,4-dichlorophenyldichlorosilane and was found to have a per cent hydrolyzable chlorine equal to around 24.3% as compared to the theoretical value of 27.3%. The deviation from the theoretical was due to certain impurities contaminating the chlorosilane.

The second product boiling at 249–250° C. at 10 mm. was identified as methyl-bis-3,4-dichlorophenylchlorosilane containing about 9.7% hydrolyzable chlorine as compared to a theoretical value of 9.6%.

*Preparation of methyl-3,4-dichlorophenyl silicone oil*

The methyl - 3,4 - dichlorophenyldichlorosilane described above was hydrolyzed in an ice water-ether mixture in the manner described in Example 1 and the ether therafter removed from the formed oil by heating on a steam bath. To 29.4 grams of this methyl-3,4-dichlorophenyl silicone oil was then added 14.6 grams hexamethyldisiloxane and 2 ml. concentrated $H_2SO_4$ and the mixture worked up in the same manner as was employed in Example 1 to get a finished oil free of excess hexamethyldisiloxane and containing about 28.5% chlorine. The formula for the individual compounds in this composition corresponded to the following:

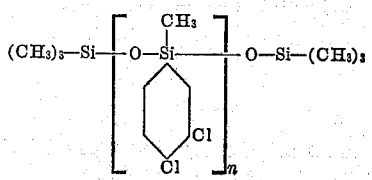

where n is an integer equal to at least 1.

EXAMPLE 3

*Preparation of methyl-m-dichlorophenyldichlorosilane*

To a mixture of 144 grams magnesium turnings in 3 liters anhydrous ether was added dropwise 1000 grams m-bromochlorobenzene. When complete reaction had been effected, the Grignard reagent was added dropwise with stirring to 500 ml. of anhydrous ether and 1000 grams of methyltrichlorosilane. Upon distillation of the reaction product, there was isolated 490.6 grams methyl-m-chlorophenyldichlorosilane boiling at 150° C. at 61 mm. Analysis of this compound showed it to contain 31.24% hydrolyzable chlorine and a total chlorine content of 47.0% which compared with the theoretical values of 31.44% hydrolyzable chlorine and 47.16% total chlorine.

*Preparation of methyl-m-chlorophenyl silicone oil*

The methyl-m-chlorophenyldichlorosilane was hydrolyzed in an ice water-ether system using the method described in Example 1 to give an oil weighing about 353.5 grams and which when analyzed was shown to have 20.4% chlorine (theoretical 20.8%). This oil was equilibrated with 353 grams of hexamethyldisiloxane in the presence of 9 ml. concentrated 95% $H_2SO_4$ (also using the method described in Example 1) and the excess hexamethyldisiloxane removed by distillation to give an oil which on analysis showed it to contain about 18.1% chlorine and whose viscosity at 100° F. was 37.1 centistokes and at 210° F. was 8.21 centistokes, indicating a viscosity temperature coefficient equal to 0.78. This composition was a mixture of linear polysiloxanes corresponding to the general formula

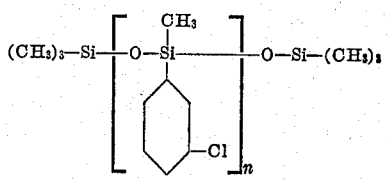

where n is an integer equal to at least 1.

In order to test the effectiveness of the individual linear organopolysiloxane oil prepared in Examples 1 to 3, each of these oils was tested in a Shell Four-Ball Wear Tester (described in the magazine "Engineering" for July 14, 1933, volume 136; see also U. S. Patent 2,466,642) using various loads and different surfaces between which the particular organopolysiloxane was employed as a lubricant. As a control, a liquid linear methyl polysiloxane oil prepared in the manner described in Patnode U. S. Patent 2,469,890, issued May 10, 1949, and assigned to the same assignee as the present invention, was used. This particular linear methyl polysiloxane was prepared by cohydrolyzing trimethylchlorosilane and dimethyldichlorosilane to give a linear chain-stopped methyl polysiloxane similar to that claimed in the above-described Patnode patent. Each of the oils was placed in the Shell Four-Ball Wear Tester and subjected to its action at room temperature for one hour at 600 R. P. M. The following table discloses the results of these tests wherein the areas of the wear scar is given in millimeters.

Table I
ROOM TEMPERATURE—1 HOUR AT 600 R. P. M.

| Oil | Steel On— | | | | | |
|---|---|---|---|---|---|---|
| | Steel | | | Brass | | |
| | 5 kg. | 10 kg. | 20 kg. | 5 kg. | 10 kg. | 20 kg. |
| 1. Methyl Silicone Oil (Control)_____mm__ | 0.35 | 0.49 | _____ | 0.59 | 2.33 | _____ |
| 2. Methyl-p-chlorophenyl Silicone Oil_____mm__ | 0.21 | 0.33 | _____ | 0.42 | 0.60 | _____ |
| 3. Methyl-m-chlorophenyl Silicone Oil_____mm__ | _____ | 0.35 | 0.53 | _____ | 0.39 | 0.60 |
| 4. Methyl-3,4-dichlorophenyl Silicone Oil mm__ | 0.19 | 0.25 | _____ | _____ | 0.31 | _____ |

When the methyl-m-chlorophenyl silicone oil was tested for one hour at room temperature at 1200 R. P. M., the steel-on-steel results using 10 kg. and 20 kg. loads were 0.41 mm. and 0.49 mm. respectively, while when using a steel-on-brass combination under loads of 10 kg. and 20 kg., the results were 0.42 mm. and 0.59 mm. respectively.

It will, of course, be apparent to those skilled in the art that instead of using the methylchlorophenyl silicone oils described above, other chlorinated compositions may be employed wherein the chlorine atom attached to the benzene nucleus may be ortho to the silicon atom, or where two phenyl-substituted chlorine atoms are present in the polysiloxane in, for instance, the 2,3-, 2,4-, 2,5-, 3,5-, 2,6-, etc., positions depending upon the starting Grignard reagent employed by which the hydrolyzable methyl chlorinated phenyldichlorosilane is prepared.

When it is desired to incorporate dimethylsiloxy units, such units may be inserted by cohydrolyzing the desired methylchlorophenyldichlorosilane with, for example, dimethyldichlorosilane, and thereafter effecting the equilibration reaction with hexamethyldisiloxane. Another method comprises mixing the individual products of hydrolysis of dimethyldichlorosilane and the methyl chlorophenyldichlorosilane with hexamethyldisiloxane and equilibrating this mixture in the presence of a small amount of concentrated 95% $H_2SO_4$, e. g., from about 1 to 5 per cent, by weight, of the total weight of the polysiloxanes used. I have found it desirable when introducing the dimethylsiloxy unit to employ at most from about 1 to 50 mol per cent of the dimethylsiloxy units where it is desired to maintain optimum extreme pressure lubrication properties. I, of course, do not intend to be limited to this since, as will be apparent to those skilled in the art, higher or lower molecular concentrations of the dimethylsiloxy units may be employed without departing from the scope of the invention. From the foregoing description of the liquid linear polysiloxanes described in the present invention, where m is equal to from 1 to 2, n is equal to from 1 to 20 or more, and p may be 0 or an integer equal to from 1 to 20 or more, it is clearly apparent that the number of organic groups in the linear polysiloxanes may range from above 2 to less than 3. Moreover, in the case where $m=1$, $n=1$, and $p=20$, the ratio of chlorine atoms to silicon atoms in the organopolysiloxane is approximately at least 0.044; and where $m=2$, $n=20$, and $p=0$, the ratio of chlorine atoms to silicon atoms is 1.82. In addition, in the above-described polysiloxanes, it is seen that at least about 56.5% of the total number of organic radicals are methyl radicals in the case where $n=20$ and $p=0$.

My claimed compositions of matter in addition to having application in the lubricating fields are also eminently suitable where electrical insulating fluids, hydraulic fluids, damping fluids, etc., are used. They may be admixed with other materials, for example, metallic soaps, inhibitors, anti-oxidants, etc., to form greases.

What I claim as new and desire to secure by Letters Patent of the United States is:

1. A liquid linear polysiloxane corresponding to a general formula

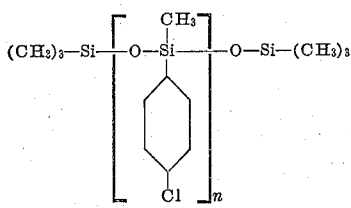

where $n$ is an integer equal to at least 1.

2. A liquid linear polysiloxane corresponding to a general formula

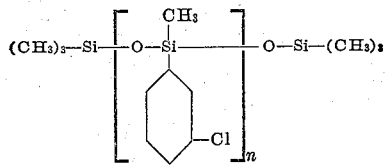

where $n$ is an integer equal to at least 1.

3. A liquid linear polysiloxane corresponding to a general formula

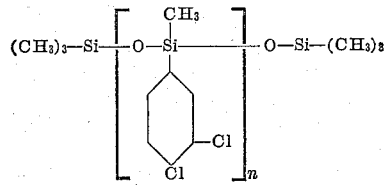

where $n$ is an integer equal to at least one.

4. A liquid linear polysiloxane corresponding to a general formula

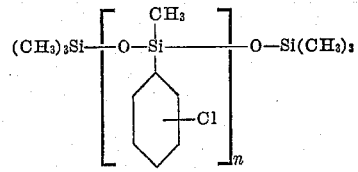

where $n$ is an integer equal to at least 1.

5. A liquid linear polysiloxane corresponding to a general formula

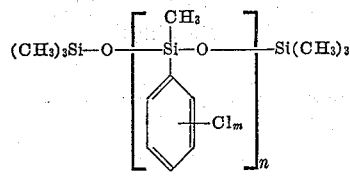

where $m$ is an integer equal to from 1 to 2 and $n$ is an average value of at least 2.

6. A lubricant composed essentially of a liquid copolymeric siloxane having a degree of substitution of greater than 2 and less than 3 organic radicals per silicon atom, said siloxane containing chlorinated phenyl radicals having substituted thereon from 1 to 2, inclusive, chlorine atoms, the remaining organic radicals in said siloxane being methyl radicals, in which siloxane the chlorinated phenyl radicals are present in amount so that the ratio of chlorine atoms to silicon atoms is above 0.044, and in which siloxane at least about 56.5 percent of the total number of organic radicals are methyl radicals.

7. A composition of matter composed of a liquid copolymeric siloxane having a degree of substitution of greater than 2 and less than 3 organic radicals per silicon atom, said siloxane containing chlorinated phenyl radicals having substituted therein from 1 to 2 chlorine atoms, the remaining organic radicals in said siloxane being methyl radicals, in which siloxane the chlorinated phenyl radicals are present in amount so that the ratio of chlorine atoms to silicon atoms is above 0.044, and in which siloxane at least about 56.5 percent of the total number of organic radicals are methyl radicals.

References Cited in the file of this patent

UNITED STATES PATENTS

| Number | Name | Date |
|---|---|---|
| 2,258,219 | Rochow | Oct. 7, 1941 |
| 2,258,222 | Rochow | Oct. 7, 1941 |
| 2,457,677 | Hyde | Dec. 28, 1948 |
| 2,469,888 | Patnode | May 10, 1949 |
| 2,469,890 | Patnode | May 10, 1949 |
| 2,599,984 | Fletcher et al. | June 10, 1952 |